United States Patent [19]

Shimodaira

[11] 4,216,848
[45] Aug. 12, 1980

[54] CENTRIFUGAL BRAKING DEVICE

[75] Inventor: Toyohisa Shimodaira, Hitachi, Japan

[73] Assignee: Hitachi, Ltd., Japan

[21] Appl. No.: 937,981

[22] Filed: Aug. 30, 1978

[30] Foreign Application Priority Data

Sep. 6, 1977 [JP] Japan .................................. 52-106274
Oct. 19, 1977 [JP] Japan .................................. 52-125965
Mar. 18, 1978 [JP] Japan .................................. 53-31419

[51] Int. Cl.² .......................................... F16D 67/02
[52] U.S. Cl. .................................. 188/71.2; 188/72.8;
188/184; 188/187; 192/103 B
[58] Field of Search ................... 188/72.8, 71.2, 184,
188/185, 186, 187; 192/103 A, 103 B

[56] References Cited

U.S. PATENT DOCUMENTS

| 2,074,476 | 3/1937 | Kolb ........................... 192/103 B X |
| 2,316,184 | 4/1943 | Peremi et al. ................... 188/187 |
| 3,160,252 | 1/1964 | Steinlein ..................... 192/103 A X |
| 3,536,173 | 10/1970 | Merkert ..................... 192/103 A X |
| 4,095,681 | 6/1978 | David ......................... 188/72.8 X |

FOREIGN PATENT DOCUMENTS 389004  10/1973  U.S.S.R. ................................... 188/185

*Primary Examiner*—George E. A. Halvosa
*Attorney, Agent, or Firm*—Craig & Antonelli

[57] ABSTRACT

Centrifugally activated members adapted to project outwardly by centrifugal forces when the rotational speed of a shaft to be braked reaches a predetermined level are brought into contact with a brake shoe to impart a rotational force thereto. When rotated, the brake shoe moves axially of the shaft to be braked so as to force a brake wheel, mounted on the shaft to be braked, against a brake disk, thereby applying the brake to the shaft to be braked.

10 Claims, 9 Drawing Figures

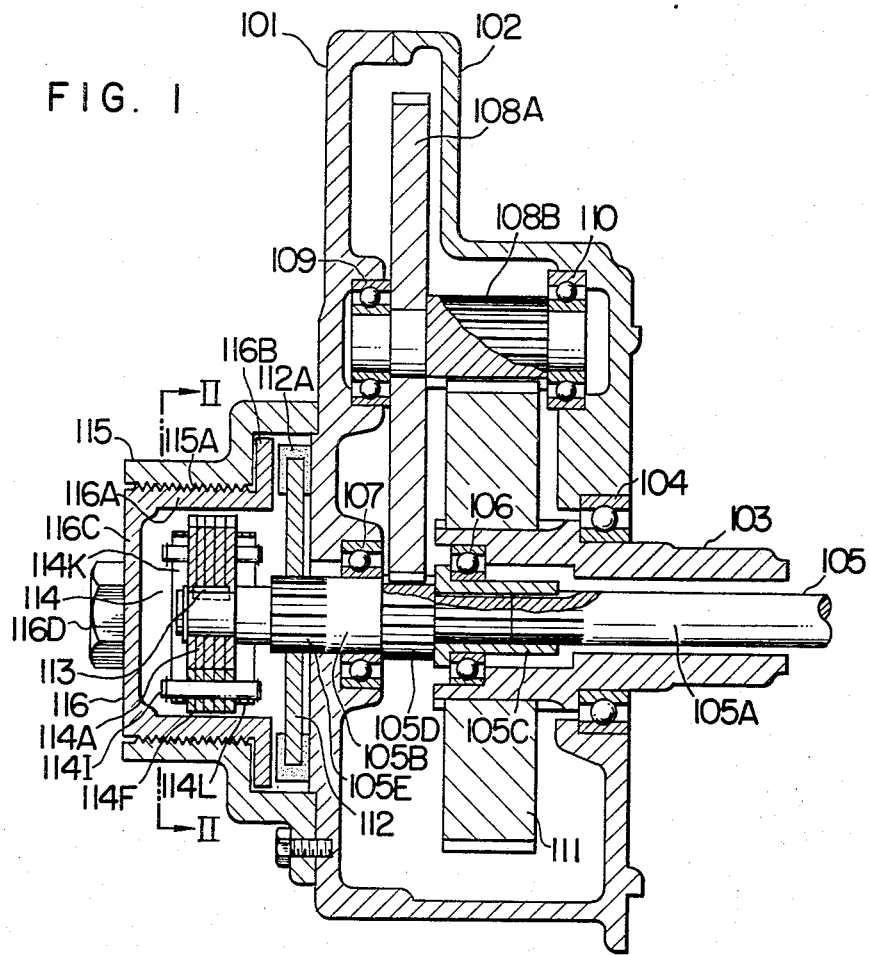

CENTRIFUGAL BRAKING DEVICE

BACKGROUND OF THE INVENTION

1. Field of the Invention

This invention relates to centrifugal braking devices, and more particularly to a centrifugal braking device adapted to be actuated to stop the rotation of a shaft to be braked when the rotational speed of the latter reaches a predetermined level.

2. Description of the Prior Art

A centrifugal brake adapted to be actuated to apply the brake to a shaft to be braked when the rotational speed thereof reaches a predetermined level has generally been well known as a safety brake. Such centrifugal brake is of a construction such that centrifugally activated members mounted on the shaft to be braked project outwardly into contact with a braking surface so as to apply the brake to the shaft to be braked by the friction created between them. Thus this well-known safety brake is capable of preventing an increase in the rotational speed of the shaft to be braked over and above a predetermined level but is not capable of stopping the rotation thereof. Proposals have hitherto been made to provide the braking surface with offset portions for receiving the centrifugally activated members when the latter project outwardly to lock the shaft to be braked and stop the rotation thereof. However, since the shaft to be braked is instantaneously locked, component parts of this brake must have strength high enough to withstand an impact of a high magnitude produced when the shaft to be braked is locked. One problem encountered with this type of braking device is that, when the braking device is used with a hoist, etc., and the braking device has been actuated, it is impossible to unlock the braked shaft unless the load suspended by the hoist is removed by a separate device.

SUMMARY OF THE INVENTION

This invention has as its object the provision of a centrifugal braking device which is capable of stopping the rotation of a shaft to be braked by an impact of a reduced magnitude.

The outstanding characteristic of this invention is that the braking device is provided with centrifugally activated members adapted to project outwardly when the rotational speed of a shaft to be braked reaches a predetermined level. When moving outwardly, the centrifugally activated members cause a brake shoe to rotate and move axially of the shaft to be braked so as to bring friction surfaces into contact with each other to apply the brake to the shaft to be braked.

According to a preferred embodiment of the invention, the shaft to be braked is provided with a brake wheel. When the rotational speed of the shaft to be braked reaches a predetermined level, the centrifugally activated members impart a rotational force to the brake shoe at initial stages. However, after the brake shoe is brought into contact with the brake wheel, a rotational force is given to the brake shoe by the brake wheel too. Therefore, the brake shoe further moves axially of the shaft to be braked to apply the brake thereto to stop the rotation thereof, even after the rotational speed of the braked shaft is reduced below the predetermined level.

BRIEF DESCRIPTION OF THE DRAWINGS

FIG. 1 is a vertical sectional side view of the braking device comprising a first embodiment of the invention;

FIG. 2 is a sectional view taken along the line II—II in FIG. 1;

DESCRIPTION OF THE PREFERRED EMBODIMENTS

Figure 3:
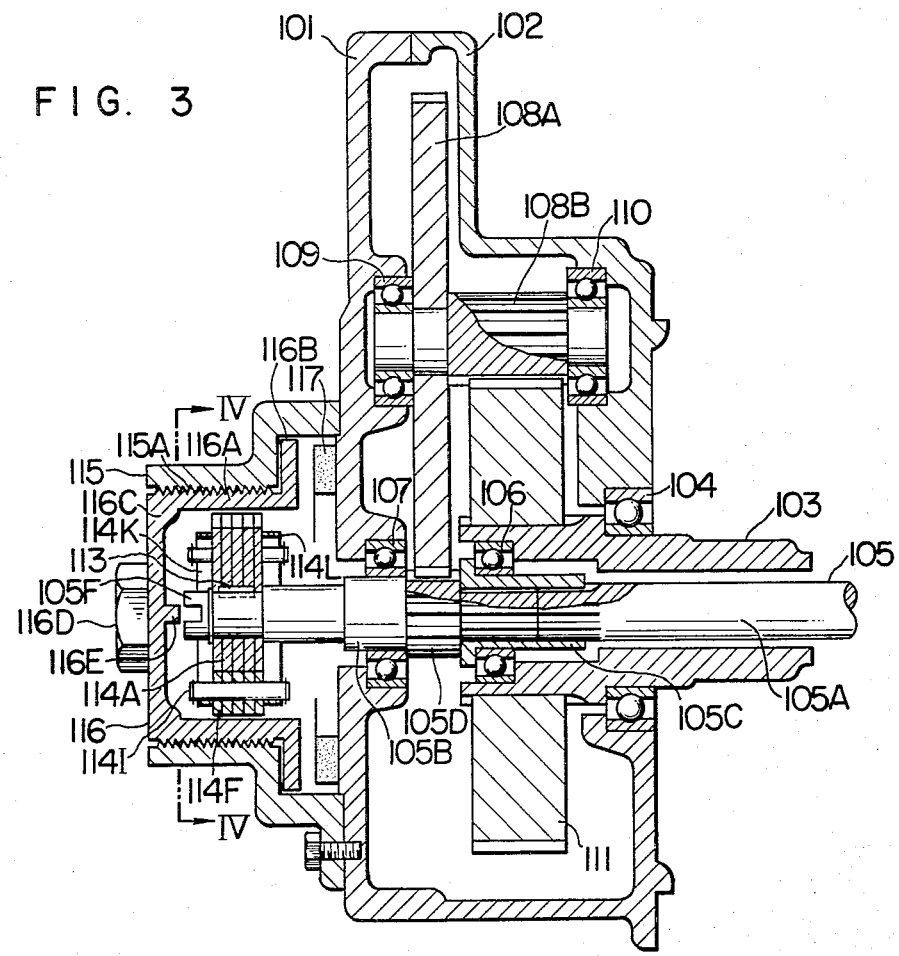
FIG. 3 is a vertical sectional side view of the braking device comprising a second embodiment of the invention.

Referring to FIGS. 1 and 2, a gear case consists of members 101 and 102. 103 designates a hollow output shaft supported by the gear case member 102 through a ball bearing 104. Ball bearings 106 and 107 located on the inner surface of the output shaft 103 and the gear case member 101 respectively support a shaft 105 to be braked which consists of an input shaft 105A and a gear shaft 105B connected to each other through a spline type coupling 105C. The gear shaft 105B carries thereon a pinion 105D which is in meshing engagement with a gearwheel 108A fixed to a gear shaft 108B supported by the gear case members 101 and 102 through ball bearings 109 and 110. The output shaft 103 carries thereon a gearwheel 111 which is in meshing engagement with the gear shaft 108B. The gear shaft 105B extends outwardly of the gear case member 101, and a brake wheel 112 is connected to the extension of the gear shaft 105B through a spline 105E and a centrifugal mechanism 114 is keyed at 113 to the extension of the gear shaft 105B.

The centrifugal mechanism 114 includes a centrifugally activated member support 114A keyed to the extension of the gear shaft 105B. The centrifugally activated member support 114A is formed at its outer periphery with cutouts 114B, 114C and 114D located equidistantly from one another for mounting therein centrifugally activated members 114E, 114F and 114G respectively. The centrifugally activated members 114E, 114F and 114G are supported by supporting pins 114H, 114I and 114J respectively, and ring springs 114K and 114L are mounted around the supporting pins 114H to 114J to force the centrifugally activated members 114E to 114G against the bottoms of the cutouts 114B to 114D respectively. 115 designates a brake case screwed to an end surface of the gear case member 101. 116 designates a cylindrical bottomed brake shoe including a cylindrical portion 116A formed on its outer surface with a threaded portion adapted to threadably engage a threaded portion 115A formed on an inner surface of the brake case 115. The brake shoe 116 is formed at its open end with a flange 116B which is in spaced juxtaposed relation to a lining 112A provided at the outer periphery of the brake wheel 112. The internally threaded portion 115A is of a construction such that, when the brake shoe 116 rotates in the same direction as the shaft 105 to be braked, the brake shoe 116 moves toward the brake wheel 112. The brake shoe 116 includes a cylindrical portion 116A having an inner surface disposed in spaced juxtaposed relation to the outer peripheral surfaces of the centrifugally activated members 114E to 114G. When the centrifugally activated members 114E to 114G project outwardly, they are brought into frictional engagement with the inner surface of the cylindrical portion 116A, so as to cause the brake shoe 116 to rotate in the same direction as the shaft 105 to be braked. 116C designates the bottom of the brake shoe 116 formed thereon with a tool engaging projection 116D.

In the aforesaid construction, the brake shoe 116 can be moved rearwardly (to the position shown in FIG. 1), before the braking device is activated, by applying a wrench to the projection 116D and rotating the brake shoe 116 in a direction opposite to the shaft 105 to be braked. While the shaft 105 to be braked rotates at speeds below a predetermined rotational speed level, the centrifugally activated members 114E to 114G are forced against the bottoms of the cutouts 114B to 114D respectively by the biasing forces of the springs 114K and 114L. Thus the brake shoe 116 remains in its rearward position, and the brake wheel 112 rotates freely, so that the rotational force of the shaft 105 to be braked is transmitted to the output shaft 103 through the gears 105D, 108A, 108B and 111.

However, if the rotational speed of the shaft 105 to be braked reaches the predetermined level, then the centrifugal forces acting on the centrifugally activated members 114E to 114G become greater than the biasing forces exerted by the springs 114K and 114L to hold the members 114E to 114G at the bottoms of the cutouts 114B to 114D respectively, with the result that the centrifugally activated members 114E to 114G project outwardly into contact with the inner surface of the cylindrical portion 116A of the brake shoe 116. This contact causes the brake shoe 116 to rotate in the same direction as the shaft 105 to be braked, so that the brake shoe 116 is moved toward the brake wheel 112 by the action of the threaded portion 115A. Thus the flange 116B of the brake shoe 116 forces the lining 112A of the brake wheel 112 against the end surface of the gear case member 101, thereby producing a braking force. The rotational force of the brake shoe 116 is increased by the friction created between the flange 116B and the brake wheel 112, and the axial movement of the brake shoe 116 increases the pressure applied to the brake wheel 112, and in turn increases a magnitude of the brake force. Thus a braking force of a high magnitude is produced, thereby stopping the rotation of the braked shaft 105. The braking device described above is capable of applying the brake to the braked shaft 105 with regard to rotation thereof in one direction only. However, this centrifugal braking device is effective as a safety brake device when incorporated in a hoist, for example, in which the rotation transmitted from the load takes place in one direction only.

In releasing the braking force exerted on the brake wheel 112, a wrench is applied to the projection 116D at the bottom of the brake shoe 116 to turn the brake shoe 116 in the reverse direction. This causes the brake shoe 116 to move rearwardly and weakens the braking force. Therefore, in the case of the braking device incorporated in a hoist, for example, the brake shoe 116 can be gradually moved rearwardly in such a manner that the brake wheel 112 gradually slips, so that the load can be slowly landed.

Figure 4:
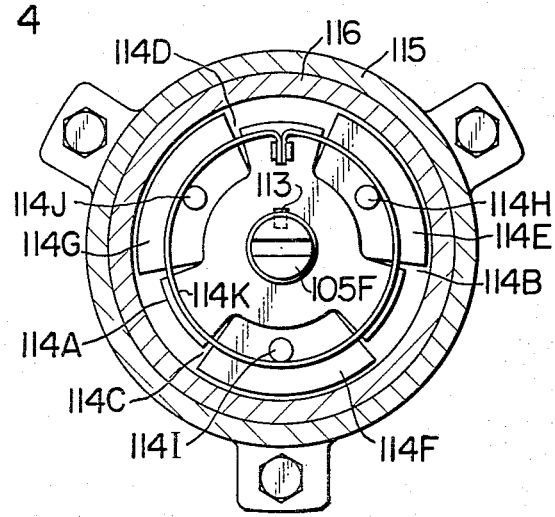
FIG. 4 is a sectional view taken along the line IV—IV in FIG. 3.

FIGS. 3 and 4 show a second embodiment of the invention in which the brake wheel is eliminated and a rotational force is imparted to the brake shoe 116 by the centrifugally activated members 114E to 114G and a projection 116E and a mating groove 105F adapted to receive the projection 116E. Other parts of the second embodiment are similar to those of the first embodiment shown in FIGS. 1 and 2. In this embodiment, the flange 116B of the brake shoe 116 is brought into contact with a brake lining 117 attached to the outer surface of the brake case member 101 and the frictional resistance produced at the time of contact is transmitted through the projection 116E at the bottom 116C of the brake shoe 116 to the groove 105F so as to apply a braking force on the shaft 105 to be braked. The projection 116E of the brake shoe 116 is out of engagement with the groove 105F of the gear shaft 105B when the brake shoe 116 is in its rearward position, thereby permitting the gear shaft 105B to rotate freely. If the rotational speed of the shaft 105 to be braked reaches a predetermined level, then the centrifugally activated members 114E to 114G project outwardly to rotate the brake shoe 116. When rotated, the brake shoe 116 moves forwardly and the projection 116E at the bottom 116C of the brake shoe 116 is brought into engagement with the groove 105F of the gear shaft 105B, so that the brake shoe 116 rotates as a unit with the gear shaft 105B. Thus the brake shoe 116 moves forwardly while rotating until the flange 116B thereof is brought in contact with the brake lining 117 to produce a frictional braking force. The braking force is transmitted to the gear shaft 105B through the projection 116E and groove 105F.

Figure 5:
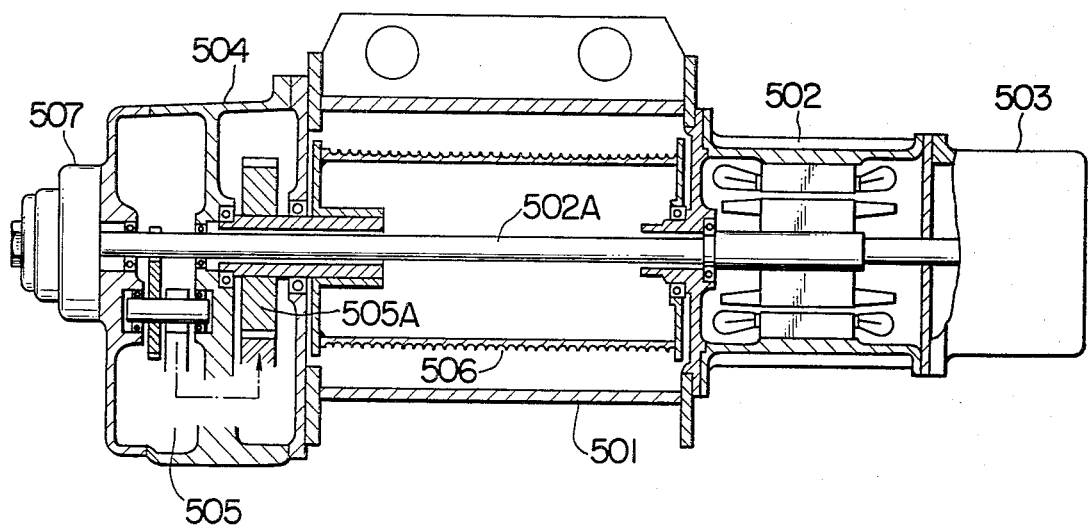
FIG. 5 is a fragmentary vertical sectional side view of a hoist incorporating therein the braking device according to the invention.

FIG. 5 shows a hoist incorporating therein the braking device according to the invention. In FIG. 5, the numeral 501 designates a main body frame having a driving electric motor 502 mounted at one end thereof. The driving electric motor 502 has a main brake 503 attached to an outer end surface thereof, and an electric motor shaft 502A extending through this outer end surface is braked by the main brake 503 when the electric motor 502 is de-energized to stop rotating. Meanwhile the electric motor shaft 502A extends through the center of the main body frame 501 and outwardly of the other end thereof. The extension of the electric motor shaft 502A does not need to be unitary with the shaft 502A and may be coupled thereto through a joint. A gear case 504 is attached to the other end of the main body frame 501, and a reduction gear system 505 reduces the speed of the electric motor shaft 502A and increases its force. A final gear 505A of the gear system 505 rotates a rope drum 506 mounted within the main body frame 501. The electric motor shaft 502A extends outwardly of the gear case 504 and has mounted thereon a safety braking device 507 (a third embodiment of the invention).

Figure 6:
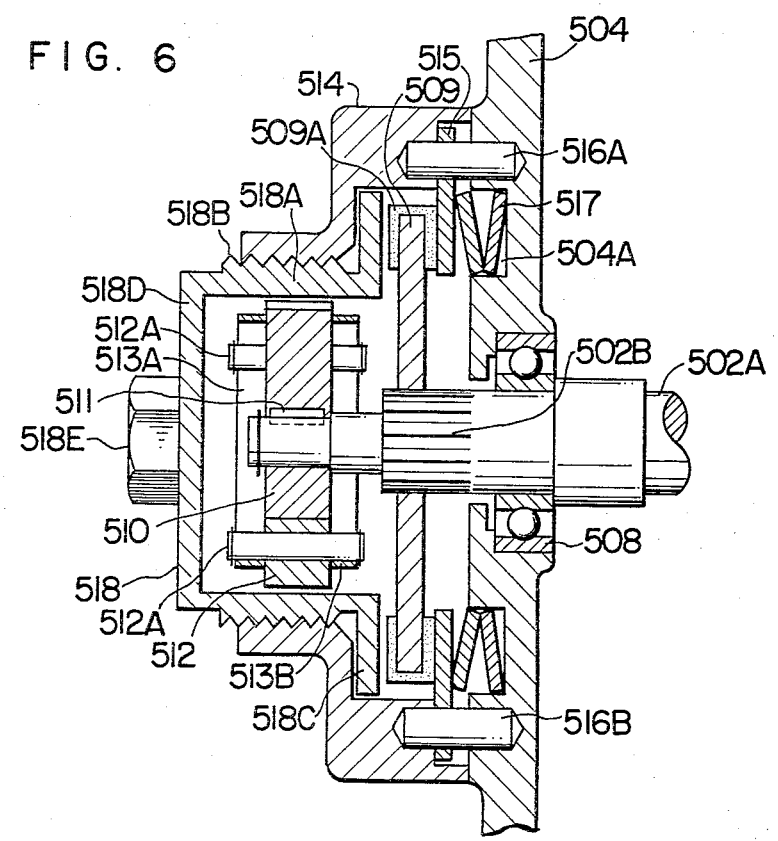
FIG. 6 is a vertical sectional side view of a third embodiment of the braking device in conformity with the invention, which is incorporated in the hoist shown in FIG. 5.

FIG. 6 shows the safety braking device 507 in detail. The extension of the electric motor shaft 502A extends outwardly of the gear case 504 through a bearing 508 mounted at the end of the gear case 504, and is formed with a straight-tooth type spline 502B for supporting a brake wheel 509, provided with a lining 509A, in such a manner that the brake wheel 509 is not rotatable relative to the shaft 502A but movable axially of the shaft. A centrifugally activated member support 510 is attached to the end of the extension of the electric motor shaft 502A by means of a key 511, and is formed at its outer periphery with three cutouts located equidistantly from one another for mounting therein three centrifugally activated members 512 respectively. The members 512 each have a supporting pin 512A, and ring springs 513A and 513B are mounted around the pins 512A in a manner to hold the members 512 therebetween so as to force the members 512 against the bottoms of the cutouts by the biasing forces of the springs 513A and 513B. The centrifugal mechanism described hereinabove is of the same construction as that of the embodiment shown in FIGS. 1 and 2. The numeral 514 designates a brake case screwed to an end surface of the gear case 504. The numeral 515 designates an annular brake disk engaging for axial movement guide pins 516A and 516B fitted in blind holes formed in the gear case 504 and the brake case 514. The gear case 504 disposed in spaced juxtaposed relation to the annular brake disk 515 is formed therein with an annular spring seat 504A which is coaxial with the shaft 502A and which mounts therein Belleville springs 517 for resiliently yieldably supporting the brake disk. The numeral 518 designates a cylindrical bottomed brake shoe formed, as is the case with the brake shoe 116 of the first embodiment, with a cylindrical portion 518A, a threaded portion 518B for threadable engagement with the brake case 514, a flange 518C, a bottom 518D and a tool engaging projection 518E.

Figure 7:
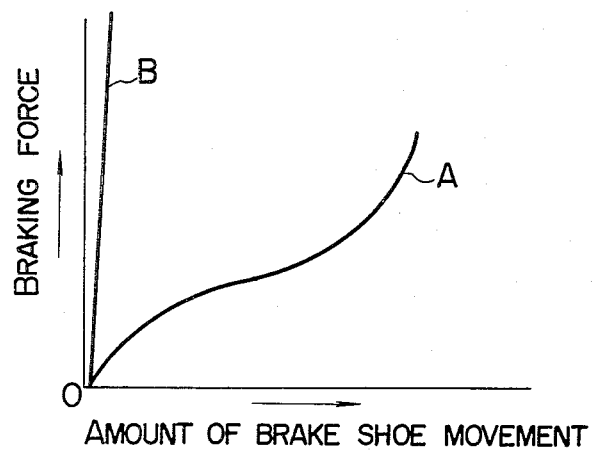
FIG. 7 is a graph showing the characteristic of the braking device shown in FIG. 6.

The hoist constructed as aforesaid normally performs the operations of raising, lowering and stopping a load by rotating the drum 506 by means of the driving electric motor 502 and the main brake 503. If the main brake 503 fails during the loading and unloading operations (particularly when the hoist is braked and inoperative), the load will move downwardly by its own weight by driving the hoist in the reverse direction. Upon the load beginning to move downwardly, the rotational speed of the electric motor shaft 502A will increase and, when it reaches a predetermined level, the centrifugally activated members 512 will project outwardly and apply the brake as is the case with the embodiment show in FIGS. 1 and 2. At this time, the brake disk 515 will move rearwardly while compressing the Belleville springs 517, so that the braking force will increase gradually as indicated by a curve A in FIG. 7. A curve B shows a brake force increase characteristic which is obtained when no spring 517 is used. Thus it will be seen that the use of the third embodiment further lessens the impact produced when the brake is applied.

Figure 8:
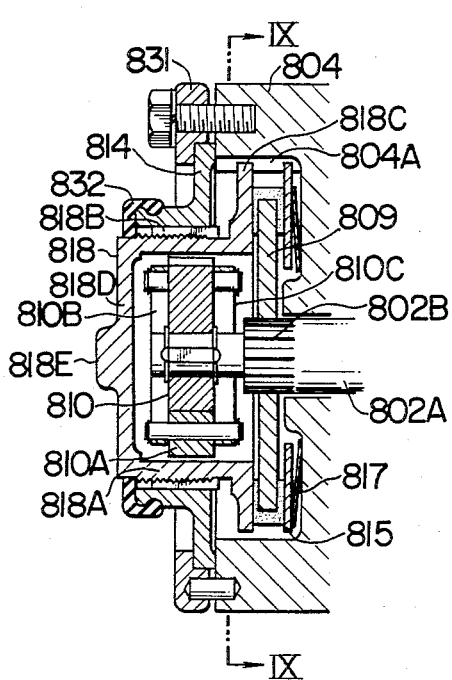
FIG. 8 is a vertical sectional side view of the braking device comprising a fourth embodiment of the invention.
Figure 9:
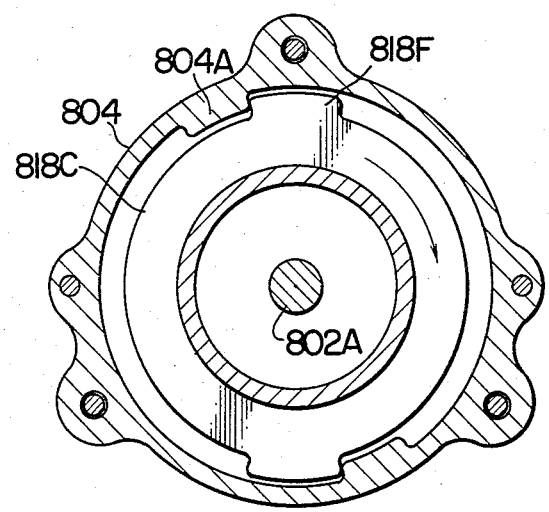
FIG. 9 is a sectional view taken along the line IX—IX in FIG. 8.

FIGS. 8 and 9 show a modification or a fourth embodiment, of the centrifugal braking device shown in FIGS. 5 and 6. The fourth embodiment is characterized by the fact that a maximum braking force exerted can be set as desired. When the braking device according to the invention is incorporated in a hoist, the braking force is reduced and the load handled is landed after the centrifugal braking device has been actuated. At this time, the brake shoe is manually turned (restored to its rearward position). However, it would be difficult to readily return the brake shoe to its rearward position if the brake shoe were wedged tightly into the brake case. In the fourth embodiment, the angle of rotation (amount of forward movement) of the brake shoe is restricted so as to enable the brake shoe to be readily moved rearwardly by hand.

Referring to FIGS. 8 and 9, a straight-tooth type spline 802B is formed in an extension 802A of an electric motor shaft and mounts thereon a brake wheel 809 which is unable to rotate relative to the shaft but movable axially thereof. Secured to an end of the shaft 802A is a centrifugally activated member support 810 which is formed, as is the case with the embodiment shown in FIG. 2, with cutouts and has centrifugally activated members 810A and annular springs 810B and 810C mounted therein. 814 designates a brake case which is held in place between a gear case 804 and a case holding member 831 which is screwed to an end of the gear case 804. Thus if the case holding member 831 is loosened, the brake case 814 can be readily rotated. 815 designates an annular brake disk which is mounted such that it is unable to rotate relative to the gear case 804 but movable axially rearwardly by the biasing force of a Belleville spring 817. The numeral 818 designates a brake shoe formed with a fitting threaded portion 818B on the outer periphery of a cylindrical portion 818A, a flange 818C at an open end thereof, and a tool engaging projection 818E at its bottom. Outwardly extending projections 818F are formed on an outer surface of the flange 818C of the brake shoe 818, and inwardly extending projections 804A are formed on an inner surface of the gear case 804. Thus when the brake shoe 818 has rotated through a certain angle, the projections 804A and 818F engage each other and prevent further rotation of the brake shoe 818. The angle through which the brake shoe 818 is allowed to rotate is decided by taking into consideration the pitch of the threaded portion 818B, because the angle influences the maximum braking force. Adjusting of the angle when the parts are assembled is effected by adjusting the angle at which the brake case 814 is mounted. 832 designates an annular rubber seal fitted between the brake case 814 and the brake shoe 818 for preventing water drops, dust and dirt from finding their way into the surfaces of the threaded portion 818B and the brake case 814.

In the fourth embodiment described hereinabove, the centrifugally activated members 810A project outwardly, when the rotational speed of the shaft 802A reaches a predetermined level, into contact with the brake shoe 818 and cause the latter to rotate. Thus the brake shoe 818 moves forwardly toward the brake wheel 809 while rotating, with the result that a lining of the brake wheel 809 is held between the flange 818C of the brake shoe 818 and the brake disk 815. In this way, the brake is applied to the shaft 802A as in the aforementioned embodiments. At this time, the maximum amount of forward movement (maximum angle of rotation) of the brake shoe 818 is restricted by the projections 804A and 818F which are brought into abutting engagement. Therefore, excessive forward movement of the brake shoe 818 is avoided. Since the maximum amount of forward movement of the brake shoe 818 is determined by the pitch of the threaded portion 818B and the allowable angle of rotation of the brake shoe 818, the brake case 814 is fixed to the gear case 804 by bringing the brake shoe 818 into engagement with the brake case 814 in initial stages in such a manner that a desired braking force can be produced by the maximum amount of forward movement of the brake shoe 818. By this arrangement, it is possible to readily weaken the braking force by applying the wrench to the projection 818E and turning the brake shoe 818 in the reverse direction, after the centrifugal brake system has been actuated.

What is claimed is:

1. A centrifugal braking device comprising:
a shaft to be braked;
centrifugally activated members mounted on said shaft for rotation and adapted to project outwardly when the rotational speed of said shaft reaches a predetermined level; and
a brake shoe means with which the centrifugally activated members are brought into contact when the latter project outwardly;
wherein the improvement comprises:
fixedly stationary supporting means for supporting said brake shoe means in a stationary condition in such a manner that said supporting means allows said brake shoe means to be rotated by the force of friction produced by contact with said centrifugally activated members and rotation of said brake shoe means in the same direction as said shaft to be braked causes axial movement of said brake shoe means; and
a braking surface means with which the brake shoe means comes into contact as the latter moves axially so as to apply the brake to said shaft.

2. A centrifugal braking device as claimed in claim 1, wherein the improvement further comprises rotation stopping means which restricts the angle of rotation of said brake shoe means.

3. A centrifugal braking devices as claimed in claim 1, wherein the improvement further comprises a tool engaging projection formed on said brake shoe means for turning the brake shoe means in the reverse direction.

4. A centrifugal braking device comprising:
a shaft to be braked;
centrifugally activated members mounted on said shaft for rotation and adapted to project outwardly when the rotational speed of said shaft reaches a predetermined level; and
a brake shoe means with which the centrifugally activated members are brought into contact when the latter project outwardly;
wherein the improvement comprises:
fixedly stationary supporting means for supporting said brake shoe means in a stationary condition in such a manner that said supporting means allows said brake shoe means to be rotated by the force of friction produced by contact with said centrifugally activated members and rotation of said brake shoe means in the same direction as said shaft to be braked causes axial movement of said brake shoe means;
a braking surface means mounted in predetermined space relation in the direction of movement of said brake shoe means; and
a brake wheel means mounted on said shaft and interposed between said brake shoe means and said braking surface means, said brake wheel means being mounted on said shaft against rotation relative to said shaft and for movement axially thereof;
said brake wheel means being held between said brake shoe means and said braking surface means when said brake shoe means moves axially, whereby the brake can be applied to said shaft to be braked.

5. A centrifugal braking device as claimed in claim 4, wherein said brake shoe means includes a cylindrical portion and a flange, said brake shoe means being rotatably supported at the outer periphery of said cylindrical portion, said cylindrical portion having an inner surface being located in spaced juxtaposed relation to said centrifugally activated members, and said flange being located in spaced juxtaposed relation to said brake wheel means.

6. A centrifugal braking device as claimed in claim 5, wherein said brake shoe means further includes a bottom formed thereon with a tool engaging projection.

7. A centrifugal braking device comprising: a shaft to be braked;
centrifugally activated members mounted on said shaft for rotation and adapted to project outwardly when the rotational speed of said shaft reaches a predetermined level; and
a brake shoe means with which the centrifugally activated members are brought into contact when the latter project outwardly;
wherein the improvement comprises:
fixedly stationary supporting means for supporting said brake shoe means in a stationary condition in such a manner that said supporting means allows said brake shoe means to be rotated by the force of friction produced by contact with said centrifugally activated members and rotation of said brake shoe means in the same direction as said shaft to be braked causes axial movement of said brake shoe means;
a brake disk means mounted in predetermined spaced relation in the direction of movement of said brake shoe means; and
a brake wheel means mounted on said shaft and interposed between said brake shoe means and said braking surface means, said brake wheel means being mounted on said shaft against rotation relative to said shaft and for axial movement;
said brake wheel means being held between said brake shoe means and said brake disk means to apply the brake to said shaft.

8. A centrifugal braking device as claimed in claim 7, wherein the improvement further comprises means for resiliently yieldably supporting said brake disk means.

9. A centrifugal braking device as claimed in claim 7, wherein said brake shoe means includes a cylindrical portion and a flange, said brake shoe means being rotatably supported at the outer periphery of said cylindrical portion, said cylindrical portion having an inner surface being located in spaced juxtaposed relation to said centrifugally activated members, and said flange being located in spaced juxtaposed relation to said brake wheel means.

10. A centrifugal braking device as claimed in claim 9, wherein said brake shoe means is formed at the outer periphery of its flange with projections for restricting the angle of rotation.

* * * * *